United States Patent [19]

Favot et al.

[11] Patent Number: 5,287,451
[45] Date of Patent: Feb. 15, 1994

[54] METHOD OF PRESENTING IMAGES ON A HARDWARE SCREEN AND A SYSTEM FOR IMPLEMENTING THE METHOD

[75] Inventors: Jean-Jacques Favot; Michael Martinez, both of Martignas sur Jalle; Jean-Noel Perbet, Eysines, all of France

[73] Assignee: Sextant Avonique, France

[21] Appl. No.: 748,430

[22] Filed: Aug. 22, 1991

[30] Foreign Application Priority Data

Aug. 23, 1990 [FR] France .................. 90 10587

[51] Int. Cl.$^5$ ............................................. G06F 15/62
[52] U.S. Cl. ................... 395/164; 395/162; 395/163
[58] Field of Search ................... 395/162-164, 395/166; 340/703, 798-800

[56] References Cited

U.S. PATENT DOCUMENTS

| | | | |
|---|---|---|---|
| 4,648,049 | 3/1987 | Dines et al. | 395/143 |
| 4,903,217 | 2/1990 | Gupta et al. | 395/166 |
| 4,933,878 | 6/1990 | Guttag et al. | 395/164 |

FOREIGN PATENT DOCUMENTS

| | | |
|---|---|---|
| 0164880 | 12/1985 | European Pat. Off. . |
| 0206178 | 12/1986 | European Pat. Off. . |
| 0279228 | 8/1988 | European Pat. Off. . |
| 0305287 | 3/1989 | European Pat. Off. . |
| 8906031 | 6/1989 | PCT Int'l Appl. . |

*Primary Examiner*—Dale M. Shaw
*Assistant Examiner*—Kee M. Tung
*Attorney, Agent, or Firm*—Barnes & Thornburg

[57] ABSTRACT

The system comprises, connected to an image generator (14), a processing unit (13) with a management unit (18), a microregion generating unit (20) and correlation circuits for selecting, for each point of the image with coordinates x, y, one of a series of predetermined pixel microregions stored in the generating unit (20) in order to correlate it in x, y, in the correlation circuits, with the previously presented microregions, before writing it in a screen memory (22) and presenting it on the screen (16). The screen memory (22) is integrated in the processing unit (13) and has a matrix of memory cells ($22^1$-$22^{16}$), organised in an identical manner to that of the microregion pixels, associated with a single matrix address bus (26) enabling the memory cells to be addressed simultaneously and connected to a generator (19) of the addresses of the memory cells and the processing unit (13) is directly connected to the image generator (14).

The invention can be applied well in avionics.

8 Claims, 3 Drawing Sheets

METHOD OF PRESENTING IMAGES ON A HARDWARE SCREEN AND A SYSTEM FOR IMPLEMENTING THE METHOD

The relates to the presentation of images on a matrix screen display, colour or black and white, from a synthesized or video image generator.

Imaging has applications in many fields and notably in avionics, which emphasises the interest of the invention.

Between the generator and the display, the images, in order to improve their quality, undergo processing, whether their resolution is higher or lower than that of the display.

The systems known at present, as will appear clearly from a reading of the following description, do not enable high definition images, with more than $1000 \times 1000$ points or picture elements (pixels), to be processed in real time, that is to say in less than 16 ms, corresponding to the 60 Hz video standard, or 20 ms, for the 50 Hz standard. It will be noted that a pixel is the smallest accessible element of the matrix screen generally associated with a primary colour, red, green or blue.

PRIOR ART

This relates notably to FR-A-8712039, which must be considered to be implicitly introduced into the present application.

It concerns the systems which, for a point to be displayed, substitute a microregion of pixels.

The image generator, for each image, supplies, in accordance with a so-called vector scan following the outline to be displayed, a sequence of pixels defined on the one hand by their coordinates in a matrix image memory, and on the screen of the display, the same, and, on the other hand, by their colour code.

By way of example, the mesh of the image and screen memory can be 1024 ($2^{10}$) rows and 1024 columns, corresponding to an addressing of each in 10 bits, whilst the capacity of the generator, if synthesizer, can be 4096 ($2^{12}$) $\times$ 4096 pixels, corresponding to $12 \times 12$ bits. The colour code can be determined in 6 bits. Depending on the capacity of the generator, the necessary number of memory addressing bits and the colour code, the memory capacity of each node of the image memory can be 8 bits.

The generator therefore addresses, in accordance with the vector scan, the image memory in which are written, at the nodes addressed, the image data comprising a colour code and two half-LSB (low significant byte) bits for the processing by microregion which will be dealt with below.

In the case of a video generator, after analogue-to-digital conversion, the image data are written not in an image memory but in a raster memory, before also being processed by microregion.

Microregion Unit

This serves to process the outline to be displayed, having regard to its characteristics such as its thickness or colour. It is programmed according to the characteristics and structure of the matrix display (brightness levels, distribution of the red, green and blue pixels according to a quad, trio or diagonal distribution, etc), the characteristics and structure of the source image to be processed, the conditions for viewing the display screen (illumination, observation distance, etc).

The microregion unit makes it possible in particular to render indiscernible visual artefacts such as the staircase effect or scintillation.

The microregion unit 3 of the prior art, with reference to FIG. 1, has, between the image memory 2 and a screen memory 4, a management unit 6, a microregion generating unit 7 and a correlation unit 8.

The management unit 6 reads the image memory 2 sequentially, that is to say according to a television scanning, by generation in 20 bits, in order to pick up again the data of the above example, of the addresses of the points in the memory. It must be emphasised here that all the points in the memory are therefore read.

The management unit 7 also generates parameters, in this case in 6 bits, for the selection of microregions stored in the unit 6.

The management block 6, finally, checks the unit 8 for correlating the microregion selected with the remainder of the image. This check is in this case carried out in 9 bits.

The management unit 6 is formed by a second generation programmable array logic device, for example from the companies Cypress Semiconductor or Advanced Micro Devices, often referred to as a PAL, a registered trade mark of the company Monolithic Memories, which can be reprogrammed according to the display used.

The microregion generating unit 7, depending on the word, in this case of 15 bits, received from the image store 2, and the selection parameters received from the management unit 6, selects a microregion.

Each microregion determines a matrix, in this case of $4 \times 4$ points (pixels) on the display, the brightness level of each point being chosen in this case from amongst sixteen. By playing on the brightness levels, it is possible easily to check the positioning of the point which is obviously illuminated on the microregion and, by means of the half-LSB bits, to offset it, in both directions, by a desired quantity, by the selection of an appropriate microregion.

The microregions are in this case transmitted in 64 bits to the correlation unit 8.

The microregion generating unit 7 is formed by an array of PROMs (programmable read only memories).

The function of the correlation unit, or barrel correlator, 8 is to change the brightness of the pixels previously written in the screen memory 4 and saved in the correlation unit in accordance with the brightness of the pixels of the microregion selected by the unit 7.

For synthesized images, a correlation function of the type SUP (A, B), which saves the point with the greatest brightness, can be envisaged. For video images, for example supplied by a television camera, a correlation function of the type SUM (A, B) or MEAN (A, B) can be envisaged.

The correlation unit consists in this case of memories of the FIFO (first in first out) type with a capacity of 1024 4-bit words and "PAL" circuits using the correlation function.

The correlated data from the correlation unit 8 are written in the screen memory 4, the writing of a pixel in the screen memory erasing the pixel which was previously written. The screen memory, which in this case is a memory of $1024 \times 1024$ 4-bit words, serves to match the image generation frequency (50 or 60 Hz) to the display refresh frequency (100 Hz).

The screen memory 4 is connected to the screen through an interface.

Where the system has a synthesizer channel and a video channel, the two respective microregion units are connected to the screen memory by a mixer designed to manage the balance level of the synthesized image with respect to the image provided by a video sensor, such as a television camera.

Finally, and with reference to FIG. 2, in the systems of the prior art, in order to present an image on a matrix screen 5 from a synthesizer or video generator 1, the generator 1 addresses a matrix image memory 2 in accordance with a vector scan in order to write therein the data for the image to be displayed, a management block 6 scans sequentially all the pixels of the image memory and reads them in order to select predetermined pixel microregions, stored in a microregion generating unit 7 and corresponding to the pixels read from the image memory in order to substitute for them, respectively, these microregions, and to correlate them with each other in a correlation unit 8 before writing them sequentially in a matrix screen memory 4 of points and displaying them sequentially on the matrix screen 5.

In this way, a pixel is processed in 50 ns and a synthesized image of 1024×1024 pixels in 56 ms, whilst a video raster is processed in 16 ms, in the 60 Hz standard, or 20 ms in the 50 Hz standard, not to mention the time for generating and storing the synthesized image, also 56 ms.

The system, for synthesized images, cannot therefore be described as "real time".

The present invention aims to propose a system and a method for presenting images on a matrix screen which can be termed real time.

The applicant derived its invention from an observation of the fact that, in the prior systems, all the image points were processed, whether or not they contained any data, and that it ought to be possible to correlate the microregions by means of the screen memory. Such an observation already implies an inventive activity.

INVENTION

This concerns first of all a method of presenting an image on a matrix screen of pixels from an image generator, in which, for each point of the image with coordinates x, y, one of a series of predetermined pixel microregions stored in a microregion generating unit is selected, in order to correlate it in x, y, with the microregions previously presented before writing it in a screen memory and presenting it on the screen, characterised by the fact that, the screen memory being organised according to a matrix of memory cells in a manner identical to that of the microregion pixels, the corresponding addresses of the memory cells are determined, from the coordinates of a point to be presented, in order to address them respectively at the same time, as in a matrix, and to read their data which are correlated with those of the corresponding new microregion selected, the microregion which is a result of the correlation is written in the screen memory and the latter is read in order to display the image on the screen.

The method of the invention, with regard to the duration, is remarkable in several respects. First of all, as is recalled here, only the pixels which carry information are processed in the case of synthesized images and the processing calls directly on the screen memory, which thus limits the memory capacity required. Then, the delay introduced by the processing is particularly reduced because of the cutting out of the storage time owing to the elimination of the image memory. Finally, the matrix addressing of the constituent screen memories results in a considerable gain in time.

When the image to be presented is a synthesized image, the microregions are written in the screen memory in a random fashion, that is to say in accordance with the outline (line or area) to be displayed.

When the image to be presented is a video image, the microregions are written in the screen memory sequentially, that is to say in accordance with a television scanning.

The invention also concerns a system for implementing a method of presenting an image on a pixel matrix screen from an image generator, according to the invention, comprising at least a processing unit incorporating management means, microregion generating means and correlation means arranged, for each point of the image with coordinates x, y, to select one from a series of predetermined pixel microregions stored in the generating means in order to correlate it in x, y, in the correlation means, with the previously presented microregions, before writing it in a screen memory and presenting it on the screen, characterised by the fact that the screen memory is integrated in the processing unit, it has a matrix of memory cells organised in an identical manner to that of the microregion pixels, associated with a single matrixed address bus enabling the memory cells to be addressed simultaneously and connected to means of generating addresses of the memory cells and the processing unit is directly connected to the image generator.

Preferably, the correlation means are associated with permutation means connected to the microregion generating means and arranged to ensure, before the correlation, correspondence between the microregions originating from the microregion generating means and those which were presented previously.

Advantageously, the presentation system of the invention comprises two identical units for processing by microregion, each functioning alternately in image processing and in display, and means for synchronising the two processing units.

The invention will be understood better by means of the following description of the prior art and of the invention, with reference to the accompanying drawing, in which FIG. 1 is a diagrammatic view of a unit for processing by microregion of the prior art;

Figure 1:
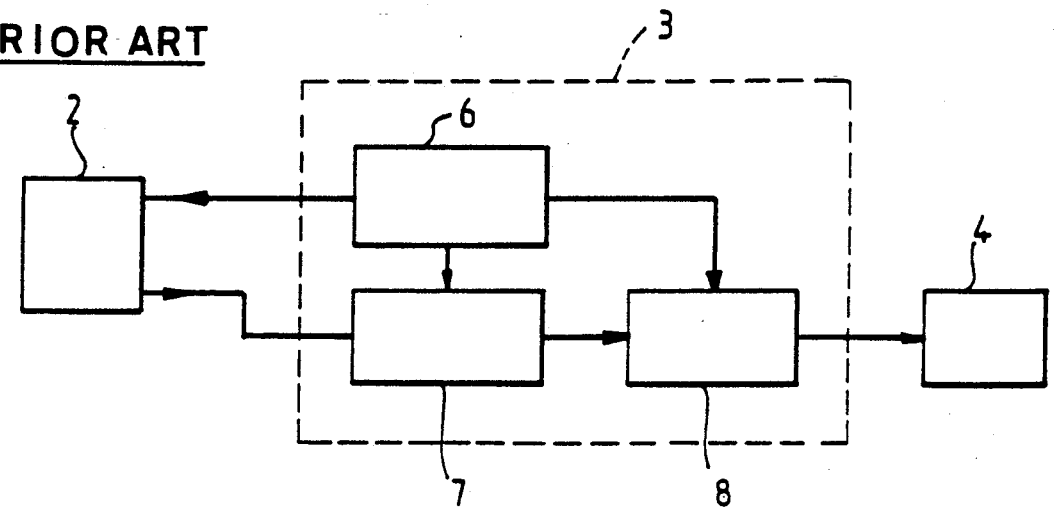
Figure 2:
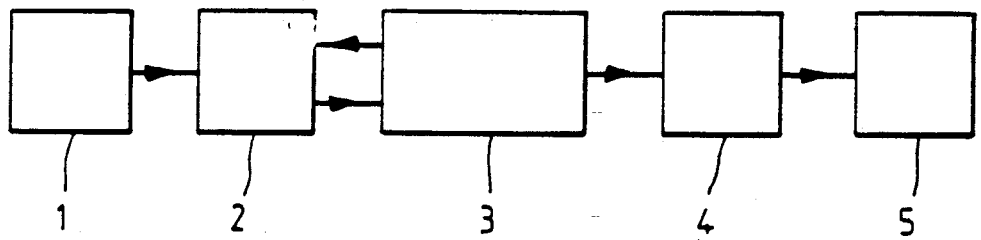
FIG. 2 is a diagrammatic view of the image presentation system integrating the unit of FIG. 1.
Figure 3:
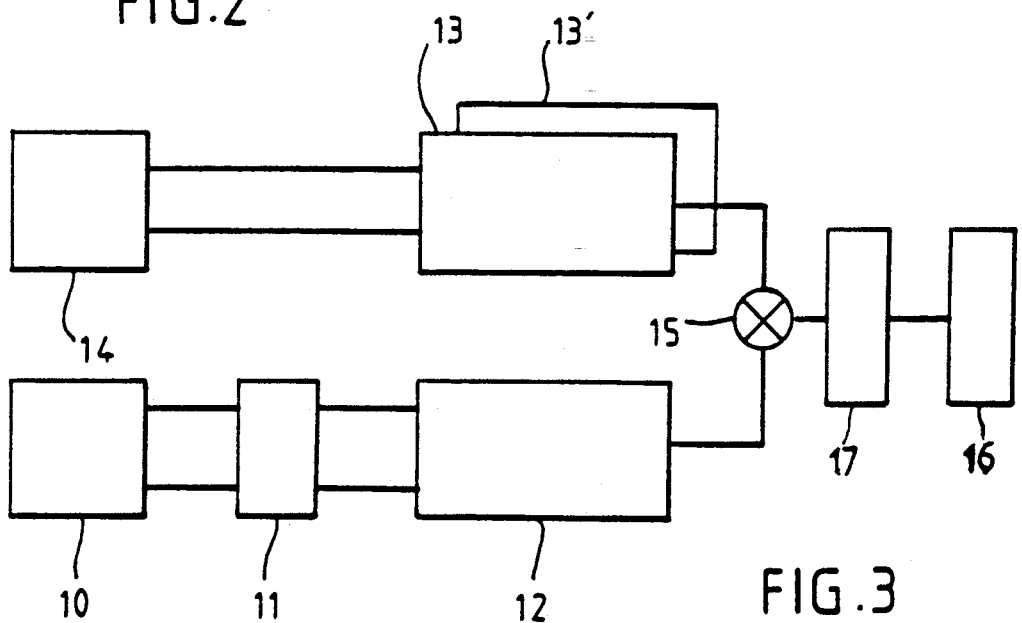
FIG. 3 is a diagrammatic view of the image presentation system of the invention.
Figure 4:
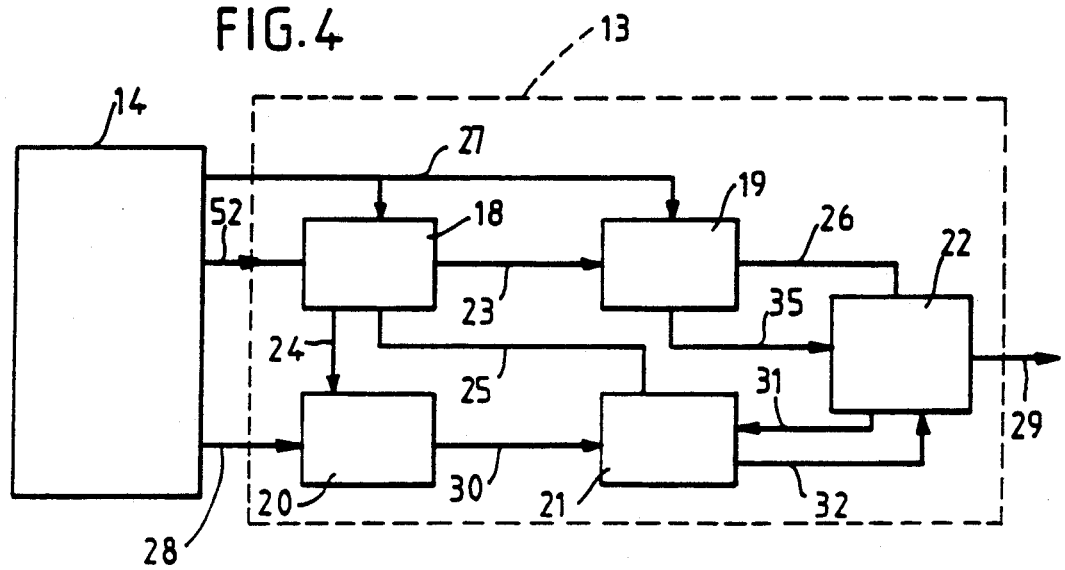
FIG. 4 is a diagrammatic view of the unit for processing by microregion of the system of FIG. 3.

Only the synthesizer channel of the image presentation system of the invention will be described below in detail, it being understood that it also has a video channel, consisting, downstream of the video generator 10, of an analogue-to-digital converter 11 and a card 12 for processing by microregion similar to that 13 of the synthesizer channel directly connected to the synthesizer generator 14, the two processing cards 12, 13 being connected to a mixer 15 connected to the image presentation screen 16 through an interface 17 (FIG. 3).

The unit 13 for processing by microregion, in this case a single one, has a management unit 18, a memory address generating unit 19, a microregion generating unit 20, identical to that of the prior art, a permutation and correlation unit 21 and a screen memory unit 22.

The management unit 18, in this case consisting of circuits of the "PAL" type, provides various functions. It controls, through the line 23, the address generator 19 according to the mode of access to the unit 13, access for writing in image processing, access for reading out image display. The unit 18 supplies to the generator 20, over the line 24, the microregion selection parameters, established as in the prior art described above, the selection taking place from image data supplied by the generator 14 over the line 28. The unit 18 controls, through the line 25, the permutation means, dealt with below, of the unit 21. For a quad structure display the microregion selection parameters are supplied in six bits, two bits of which are for coding the quad structure and four bits for coding the observation conditions. For a trio structure display, four bits for coding the trio structure are supplied and two bits for coding the observation conditions.

The unit 18 also controls the screen memory 22 through the address generating block 19 and the line 35.

Figure 5:
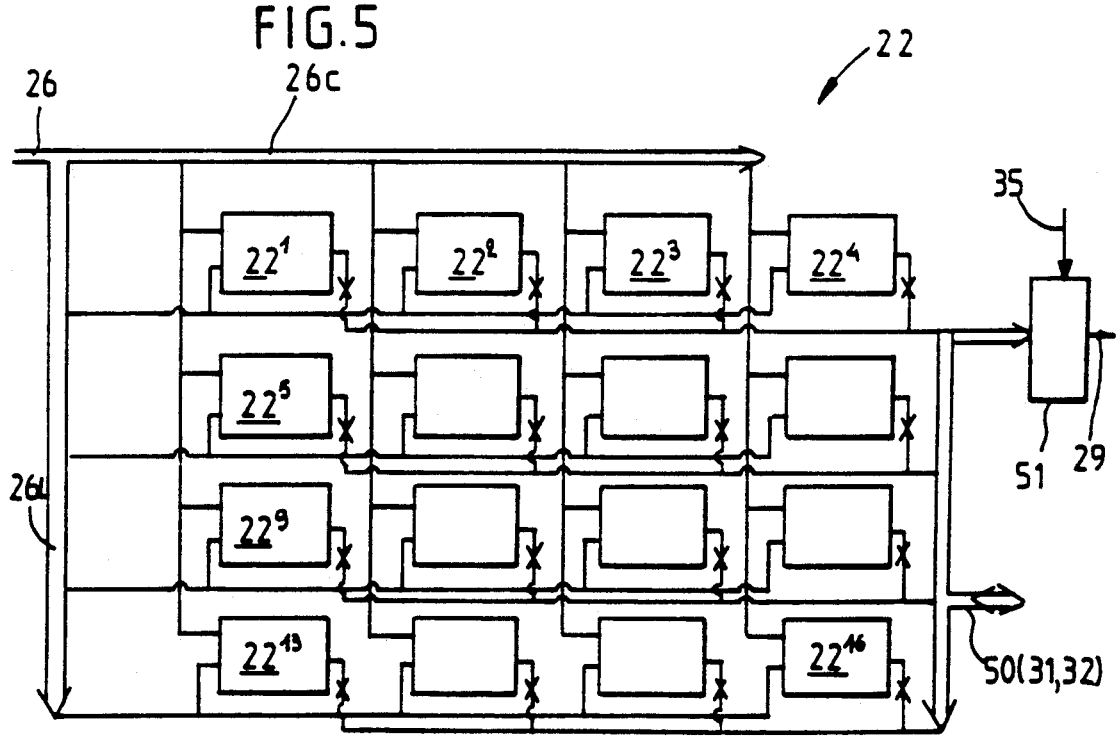
FIG. 5 is a diagrammatic view of the matrix screen memory of the unit of FIG. 4.
Figure 6:
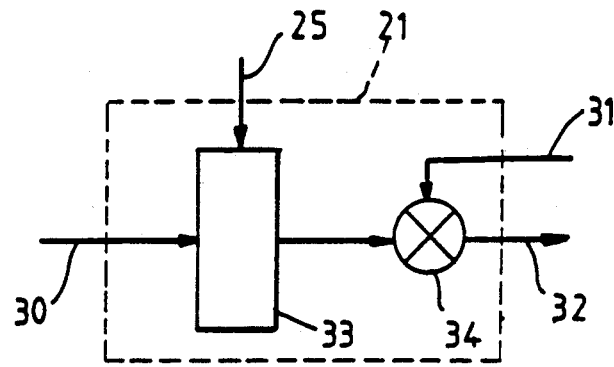
FIG. 6 is a diagrammatic view of the permutation and correlation unit of the processing unit of FIG. 4.

The screen memory 22 (FIG. 5) is formed by a matrix of constituent memories, or memory cells, $22^1$–$22^{16}$, organised in an identical way to that of the processing microregion pixels, with in this case sixteen RAMs each with a capacity of 64K 4-bit words. The memory 22 has a matrix address bus 26 which is divided into a column address bus 26C and a row address bus 26L and which enables all the cells to be addressed simultaneously, in this case in 30 ns, in order to write or read a matrix of pixels of the same structure as the processing microregions. When, for example, a microregion is written in the screen memory 22, the pixels of the microregion are thus written respectively in all the constituent memories of the screen memory. All the constituent memories in any one column receive the same address through the bus 26C and all the constituent memories in any one row receive the same address through the bus 26L.

It must be emphasised that the reading of the screen memory 22, for the display on the screen, is in this case carried out, over the line 29, sequentially, through, since it is a question of a matrix memory, the multiplexer 51 controlled by the line 35. The presentation of the pixels on a line of the display screen, for example, is effected by the simultaneous sending of the succession of four pixels, with the same row address, of the four respective constituent memories of the corresponding row of the screen memory. The column addresses are in this case incremented by 4 after each access to the screen memory. The rows of the screen memory are in this case read 4 by 4, that is to say the row addresses are incremented by 4 every 4 rows.

The address generating unit 19 is in this case formed by circuits of the "PAL" type.

By convention, and others can be considered, the basic row and column addresses delivered by the generator 14 over the line 27 correspond to the coordinates, on the display screen, of the point common to the four central pixels of the associated microregion. The addresses of the various constituent memories $22^1$–$22^{16}$ are determined from the coordinates X, Y of the pixel of the screen to be processed, delivered in this case by the synthesizer symbol generator, or by the analogue-to-digital converter associated with the video generator.

In image processing mode, the unit 19 here supplies 4 column addresses $ADRX_1$–$ADRX_4$ and 4 row addresses $ADRY_1$–$ADRY_4$, in this case in 8 bits, the coordinates X and Y each being supplied in 10 bits, in the following, non-exclusive, manner of the invention:

$ADRX_1 = (X+1)/4$ for the 1st column of cells, $ADRX_2 = X/4$ for the 2nd column of cells, $ADRX_3 = (X-1)/4$ for the 3rd column of cells, $ADRX_4 = (X-2)/4$ for the 4th column of cells, $ADRY_1 = (Y+1)/4$ for the 1st row of cells, $ADRY_2 = Y/4$ for the 2nd row of cells, $ADRY_3 = (Y-1)/4$ for the 3rd row of cells, $ADRY_4 = (Y-2)/4$ for the 4th row of cells.

In screen display mode, the basic address X, Y is generated in the unit 19 in order, as developed above, to bring about a reading of the screen memory, the addresses applied to the constituent memories being determined as in write mode.

The unit 21 ensures, in the circuits 33 of the "PAL" type, the permutation of the data supplied, over the line 30, by the microregion generator 20, under the control, through the line 25, of the management unit 18 and, in the circuits 34 of the "PAL" type, the correlation of the data thus reorganised with the data read in screen memory, over the line 31, before writing, over the line 32, the microregions correlated in the screen memory 22, the lines 31 and 32 being brought together, at the level of the screen memory 22, in the bus 50. The permutation circuits 33 ensure, before correlation, consistency between the microregions originating from the generator 20 and those which are read in screen memory 22, so that the respective pixels of the same colour correspond with each other and can be correlated.

By way of example, the sixteen elements of a microregion supplied by the generator 20 are identified by the first sixteen letters of the alphabet arranged as follows:

```
A B C D
E F G H
I J K L
M N O P
=
```

Figure 8:
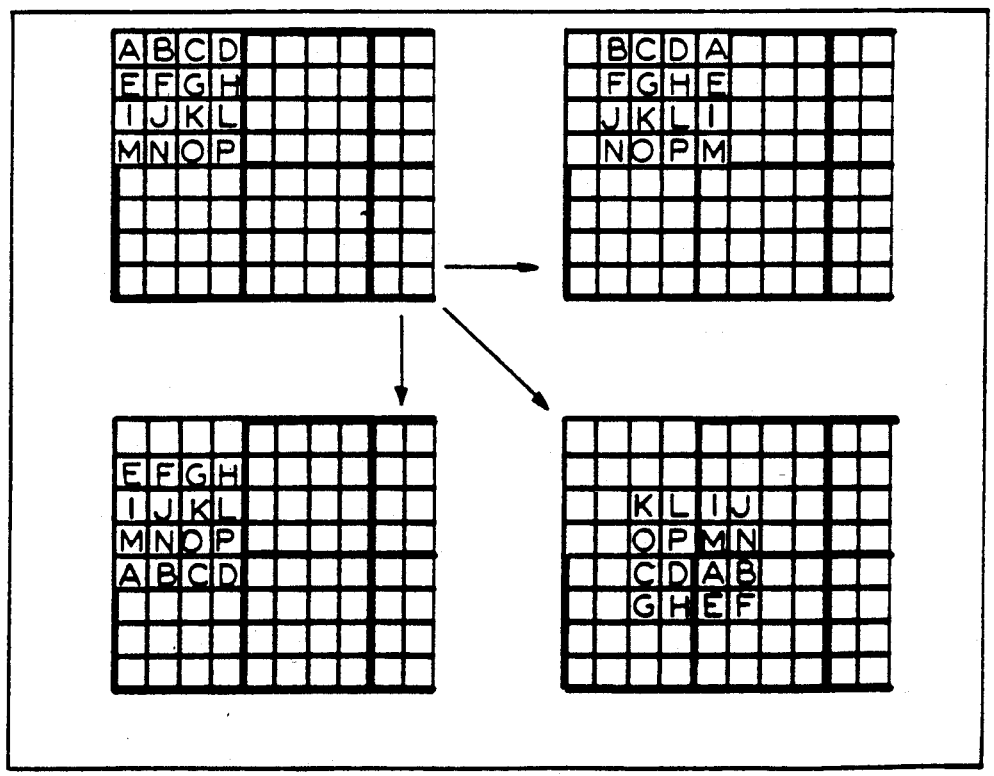
FIG. 8 illustrates different positionings of a microregion in the screen memory.

In FIG. 8 are shown four microregion positionings in the screen memory corresponding to four different addressings X, Y. At top left is illustrated the initial position of the microregion for coordinates X, Y supplying identical addresses in all the cells of the screen memory 22. In this position, there is a direct correspondence between the elements of the microregion and those of the matrix read in the screen memory 22; there is no permutation to be carried out. At top right in FIG. 8 is illustrated the pad of elements read in the screen memory corresponding to an incrementing of the coordinate X by one unit, that is to say a horizontal displacement to the right of one pixel; the correspondence between the elements of the memory and those of the microregion involves an offsetting of the latter by one element to the left:

```
B C D A
F G H E
J K L I
N O P M
```

Thus, in the horizontal direction, four cases of permutation are possible, according to the offset required, from 0 to 3, having regard to the value of X. The same applies in the vertical direction, having regard to the value of Y. Overall, for any coordinates X, Y of the centre of the microregion, sixteen different cases of permutation can arise, under the command, over the line 25, of the management block 18. At bottom left in FIG. 8 is shown the microregion with an incrementing of the coordinate Y by one unit; at bottom right is shown the microregion with an incrementing of the two coordinates X and Y by 2 units.

The correlation circuits 34 function in parallel on all the elements of the microregion and of the matrix of the memory elements. Here they use the function SUP(A, B) or SUM(A, B) for a couple between a pixel of the microregion and the corresponding pixel read in the screen memory, over the line 31. In the case of the function SUP(A, B), it is the pixel with the greatest brightness which is re-written in the screen memory over the line 32.

Figure 7:
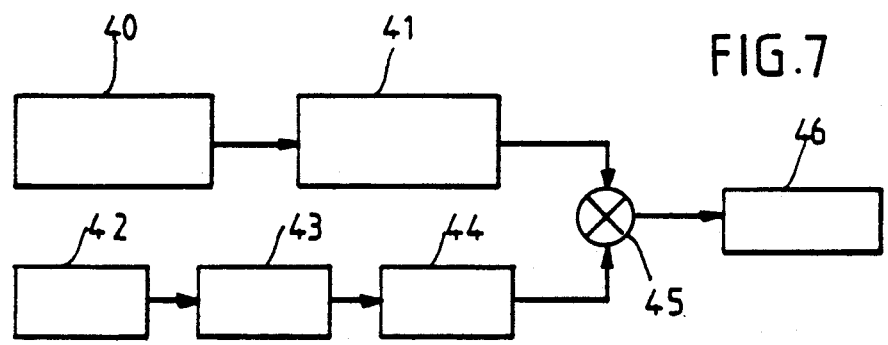
FIG. 7 is a diagrammatic illustration of the image presentation method of the invention.

Finally, the functioning of the processing unit 13 is of the random (synthesized image) or sequential (video image) type in input and in this case sequential in output. It could moreover also be random in output. It will be noted that the sequential display is particularly well suited to flat colour matrix screens such as liquid crystal (LCD) screens. With reference to FIG. 7, the processing by microregions has a stage 40 for determining the addresses of the screen memory 22 followed by a stage 41 for reading the memory, a stage 42 for determining the microregion selection parameters followed by a microregion generating stage 43 and a permutation stage 44, a correlation stage 45 following the two stages 41 and 44, terminating substantially at the same time, and preceding a stage 46 for writing in the memory. As the processing unit 13 processes only points containing information, the time taken in presenting the images of the system which has just been described is not limited by the processing speed; it depends only on the speed of generating the instructions of the synthesizer generator 14. Thus, the seven stages 40-46, for an instruction, are here executed in 100 ns corresponding to the supply of the instruction comprising the coordinates X, Y, the colour and the fine position (half-LSB bits).

The performances of the system which has just been described are remarkable. For an image cycle of 16 ms, a graphic generation at a speed of 100 ns per point and memories with an access time of 30 ns, the processing capacity during an image cycle is 160,000 image points or again 2,560,000 image points for coloured backgrounds.

The system of the invention is arranged to process images of all kinds, with microregions also of any dimensions; the definition and distribution of the coloured pixels of the matrix screen also do not limit the invention. The system can be adapted in real time to the screen observation conditions. For longer distances, at constant visual acuity, the size of the microregions can be increased. The brightness levels of their pixels can be optimised depending on the angle of observation, for liquid crystal screens, or depending on the illuminance, according to the perception of the half-tones and colours or in the case of the use of navigation aids, if it is a question of this application, in order to reduce, for example with night vision binoculars, the brightness of the red.

An image presentation system has been described above in which each channel, and notably the synthesizer channel, has only one processing unit per microregion. In this case, the images are displayed as they are processed. It would also be possible to provide, and this is even advantageous in certain respects, two identical processing units 13, 13', one functioning in processing (the mode for writing an image in its screen memory), whilst the other functions in display (the mode for reading another image in its screen memory). In this case, an image synchronisation signal, originating for example from the image presentation screen 16, has to reach the management unit 18 over the line 52.

We claim:

1. Method of presenting an image on a matrix screen of pixels from an image generator, in which, for each point of the image with coordinates x, y, one of a series of predetermined pixel microregions stored in a microregion generating unit is selected, in order to correlate it in x, y with the microregions previously presented before writing it in a screen memory and presenting it on the screen, characterized by the fact that, the screen memory being organized according to a matrix of memory cells in a manner identical to that of the microregion pixels, the corresponding addresses of the memory cells are determined, from the coordinates of a point to be presented, in order to address the memory cells respectively simultaneously, as in a matrix, and to read the memory cells' data which are correlated with those of the corresponding new microregion selected, the microregion which is a result of the correlation is written in the screen memory and the screen memory is read in order to display the image on the screen.

2. Method according to claim 1, in which the pixels of the microregions selected are permuted before correlating them with the data of the memory cells in order to ensure that they correspond.

3. Method according to claim 1, in which the microregion resulting from the correlation, the image to be presented being a synthesized image, is written in the screen memory in random mode.

4. Method according to claim 1, in which the microregion resulting from the correlation, the image to be presented being a video image, is written in the screen memory in sequential mode.

5. System for presenting an image on a matrix screen of pixels from an image generator, comprising at least one processing unit having management means, microregion generating means and correlation means arranged to select, for each point of the image with coordinates x, y, one from a series of predetermined pixel microregions stored in the microregion generating means in order to correlate it in x, y, in the correlation means, with the microregions previously presented, before writing it in a screen memory and presenting it on the screen, characterized by the fact that the screen memory is integrated in the processing unit, the screen memory has a matrix of memory cells organized in an identical manner to that of the pixels of the microregions, associated with a single matrix address bus enabling the memory cells to be addressed simultaneously and connected to means for generating addresses of the memory cells and the processing unit is directly connected to the image generator.

6. System according to claim 5, in which the cells in any one column and the cells in any one row of the screen memory are addressed respectively with the same addresses.

7. System according to claim 5, in which the correlation means are associated with permutation means connected to the microregion generating means and arranged to ensure, before correlation, consistency between the microregions originating from the microregion generating means and those which were presented previously.

8. System for presenting an image on a matrix screen of pixels from an image generator comprising:
  two processing units each having management means, microregion generating means and correlation means arranged to select, for each point of the image with coordinates x, y, one from a series of predetermined pixel microregions stored in the microregion generating means in order to correlate it in x, y, in the correlation means, with the microregions previously presented, before writing it in a screen memory and presenting it on the screen;
  each screen memory is integrated in each processing unit;
  each screen memory has a matrix of memory cells organized in an identical manner to that of the pixels of the microregions, has a single matrix address bus enabling the memory cells to be addressed simultaneously and is connected to means for generating addresses of the memory cells;
  each processing unit is directly connected to the image generator and functions alternately in a writing mode for writing in its screen memory and a reading mode for reading its screen memory; and
  means for synchronizing the two processing units.

* * * * *

UNITED STATES PATENT AND TRADEMARK OFFICE
CERTIFICATE OF CORRECTION

PATENT NO. : 5,287,451

DATED : February 15, 1994

INVENTOR(S) : Jean-Jacques Favot; Michael Martinez

It is certified that error appears in the above-identified patent and that said Letters Patent is hereby corrected as shown below:

On the Title Page:

correct Assignee to: Sextant Avionique

Signed and Sealed this

Second Day of August, 1994

*Attest:*

BRUCE LEHMAN

*Attesting Officer*      Commissioner of Patents and Trademarks